US008099942B2

(12) United States Patent
Alexander et al.

(10) Patent No.: US 8,099,942 B2
(45) Date of Patent: Jan. 24, 2012

(54) METHODS AND SYSTEMS FOR OUTPUT VARIANCE AND FACILITATION OF MAINTENANCE OF MULTIPLE GAS TURBINE PLANTS

(75) Inventors: Michael Joseph Alexander, Simpsonville, SC (US); Rahul Mohan Joshi, Orlando, FL (US); Matthew Charles Prater, Greer, SC (US); William Randolph Hurst, Easley, SC (US); John Reuben Aiton, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 1224 days.

(21) Appl. No.: 11/879,317

(22) Filed: Jul. 17, 2007

(65) Prior Publication Data

US 2008/0229757 A1 Sep. 25, 2008

Related U.S. Application Data

(60) Provisional application No. 60/896,177, filed on Mar. 21, 2007.

(51) Int. Cl.
*F02C 3/20* (2006.01)

(52) U.S. Cl. .......................... 60/39.463; 60/739; 60/778

(58) Field of Classification Search .................... 60/776, 60/778, 39.281, 732, 733, 739, 39.463, 734, 60/224
See application file for complete search history.

(56) References Cited

U.S. PATENT DOCUMENTS

| | | | | |
|---|---|---|---|---|
| 3,875,380 | A | 4/1975 | Rankin | |
| 3,919,623 | A | 11/1975 | Reuther | |
| 2007/0130952 | A1 * | 6/2007 | Copen | 60/772 |
| 2008/0190092 | A1 * | 8/2008 | Osakabe et al. | 60/39.12 |

* cited by examiner

*Primary Examiner* — William Rodriguez
*Assistant Examiner* — Andrew Nguyen
(74) *Attorney, Agent, or Firm* — Armstrong Teasdale LLP

(57) ABSTRACT

A method of operating a power generation system is provided. The system includes a first gas turbine engine that uses at least one of a primary fuel and a secondary fuel, and at least one second gas turbine engine that operates using at least one of a primary and secondary fuel. The method includes supplying primary fuel to at least one of the first and second engines from a common fuel source coupled to the first and second engines, and selectively operating the first engine between a first operational position and a second operational position. The first engine using only secondary fuel in the first operational position and operates using only primary fuel in the second operational position. The method includes supplying the second engine with primary fuel from the common fuel source without flaring the primary fuel.

14 Claims, 1 Drawing Sheet

METHODS AND SYSTEMS FOR OUTPUT VARIANCE AND FACILITATION OF MAINTENANCE OF MULTIPLE GAS TURBINE PLANTS

CROSS REFERENCE TO RELATED APPLICATION

This application claims the benefit of U.S. Provisional Application No. 60/896,177, filed Mar. 21, 2007.

BACKGROUND OF THE INVENTION

The present invention relates to any multiple gas turbine power plant with a primary and secondary fuel source that requires gas turbine start-up and shutdown on secondary fuel. More specifically, the present invention relates to Integrated Gasification and Combined Cycle (IGCC) power plants, and more particularly, to methods and systems for removing or returning gas turbines from service to vary plant output or facilitate maintenance on a particular unit.

IGCC plants generally use coal gasification, cooling, cleaning, and saturation equipment, balanced with on-site generation of oxygen and nitrogen to produce a primary plant fuel typically known as syngas. At least some known IGCC plants include a plurality of gas turbines that are powered by syngas received from a common gasification source(s). Accordingly, the common gasification source(s) must respond to any change in fuel demands of the turbines during, for example, a shutdown or start-up of one or more of the gas turbines. Generally, a shutdown of one or more of the turbines may be required during times of maintenance or for a reduction of plant output (i.e., turndown) while maintaining operation of the gasification source(s) at full or reduced rates.

Many gas turbines consume syngas to generate power. This process requires initial firing and loading to a predetermined point using a secondary or back-up fuel, such as natural gas or distillate, followed by fuel transfer, completely or partially, to syngas operation. To return IGCC plants to increased output by bringing one or more offline gas turbine(s) back online, syngas must be flared until the fuel flow rate and fuel condition meets the requirements for transfer. Generally, such methods of bringing a unit online and taking a unit offline regularly produce undesirable plant emissions.

BRIEF DESCRIPTION OF THE INVENTION

The present invention provides a method of transferring a gas turbine from secondary (back-up) fuel, such as natural gas or distillate, to primary fuel, such as syngas, without flaring the primary fuel, while at least one gas turbine is online consuming primary fuel from a common source(s). This sequence of events is commonly called an add-on start of a gas turbine in a multiple gas turbine power plant. This situation typically occurs when a power plant increases plant output after operating at a reduced output (turndown) with at least one gas turbine offline, or after offline maintenance was performed on one or more of the turbines.

In order to run on primary fuel, a gas turbine must initially operate on a secondary fuel and then transfer to the primary fuel source. For the first unit start-up, flaring primary fuel until primary fuel quality is established for transfer is unavoidable. However, for additional units coming online to be fed from the same primary fuel source, secondary fuel may be used to replace primary fuel in the online unit. This ensures that the required quantity of primary fuel to transfer the unit coming online is available without sacrificing output of the online unit. As a result, rather than flaring primary fuel, back-up fuel is used to maintain output. This sequence may also be reversed to take units offline without flaring. To enable operation of this feature where moisture is present in the primary fuel lines to offline units must circulate the primary fuel continuously.

In one aspect, a method of operating a power generation system is provided. The system includes a first gas turbine engine that uses at least one of a primary fuel and a secondary fuel, and at least one second gas turbine engine that and that operates using at least one of a primary and secondary fuel. The method includes supplying primary fuel to at least one of the first and second engines from a common fuel source coupled to the first and second engines, and selectively operating the first engine between a first operational position and a second operational position. The first engine using only secondary fuel in the first operational position and operates using only primary fuel in the second operational position. The method includes supplying the second engine with primary fuel from the common fuel source without flaring the primary fuel.

In a further aspect, a power generation plant is provided. The power generation plant includes a first gas turbine engine configured to operate using at least one of a primary fuel and a secondary fuel, the first gas turbine engine is configured to be selectively operable between a first operational position and a second operational position, wherein the first gas turbine engine operates using only the secondary fuel in the first operational position and operates using only primary fuel in the second operational position. The power generation plant further includes at least one second gas turbine engine configured to operate using at least one of a primary fuel and a secondary fuel. The power generation plant also includes a common fuel source coupled to the first and second gas turbine engines. The fuel source is configured to supply at least one of the first and second gas turbine engines with the primary fuel without flaring the primary fuel.

In another aspect, a fuel control system is provided. The fuel control system controls a flow of fuel to a first gas turbine engine that operates using at least one of a primary fuel and a secondary fuel, and controls a flow of fuel to at least one second gas turbine engine to ensure the second gas turbine engine operates using at least one of a primary fuel and a secondary fuel. The fuel control system is configured to supply at least one of the first and second gas turbine engines with primary fuel from a common fuel source coupled to the first and second gas turbine engines, selectively position the first gas turbine engine between a first operational position and a second operational position, wherein the first gas turbine engine operates using the secondary fuel in the first operational position and operates using the primary fuel in the second operational position, and supply the second gas turbine engine with the primary fuel from the common fuel source without flaring the primary fuel.

DETAILED DESCRIPTION OF THE INVENTION

Figure 1:
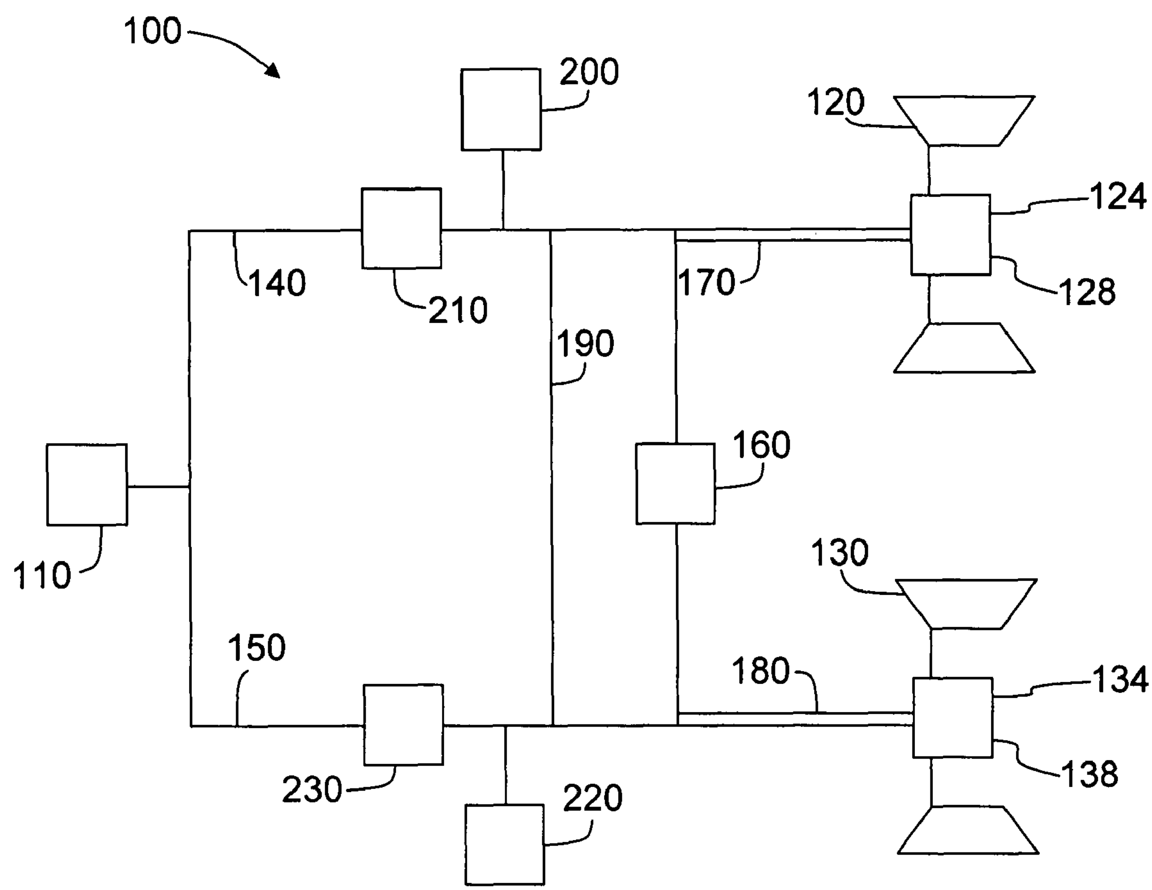
FIG. 1 is a schematic view of an exemplary integrated gasification combined cycle power system.

The present invention facilitates completing a transfer associated with the start up, or shut down, of a combustion turbine without flaring or changing a flow rate of primary fuel. In the exemplary embodiment, this invention relates to multiple train integrated systems where a primary fuel source is generated and the rate of change of fuel gas production may be dissimilar to a gas turbine transfer rate. Further, in the exemplary embodiment, this invention utilizes peer-to-peer communication between operating unit controllers to establish the initial operating conditions.

FIG. 1 is a schematic view of an exemplary integrated gasification combined cycle power system 100. In the exemplary embodiment, system 100 includes a primary source of syngas 110 in flow communication with a first turbine 120 and a second turbine 130. In the exemplary embodiment, first turbine 120 includes a secondary manifold 124 and a primary manifold 128. Second turbine 130 also includes a primary manifold 134 and a secondary manifold 138. In this exemplary embodiment, each primary manifold continually has primary (i.e., syngas) fuel flow, secondary (i.e., natural gas) fuel flow, or some combination thereof during operation, and the secondary manifold has only primary fuel. Specifically, in the exemplary embodiment, each secondary manifold 124 and 138 is coupled in flow communication with the primary source of syngas 110 via respective piping 140 and 150. Further, in the exemplary embodiment, each primary manifold 128 and 134 is coupled in flow communication with a secondary fuel source 160 via piping 170 and 180. As will be appreciated by one of ordinary skill in the art, system 100 can include any number of turbines fluidly coupled to the primary source of syngas 110.

In the exemplary embodiment, system 100 also includes a flare 200 and a first scrubber 210 that are each in flow communication between first turbine 120 and the primary source of syngas 110. Further, in the exemplary embodiment, a second flare 220 and a second scrubber 230 are each in flow communication between second turbine 130 and the primary source of syngas 110.

In the exemplary embodiment, each turbine 120 and 130 receives secondary fuel from secondary fuel source 160 to facilitate a start-up of turbines 120 and 130. Each turbine 120 and 130 receives primary fuel from scrubbers 210 and 230, respectively. During start conditions in some known systems 100, the primary fuel is ignited by flares 200 and 220 prior to reaching turbines 120 and 130, respectively.

In the exemplary embodiment, a method for shutting down or transferring one of first turbine 120 or second turbine 130 without having to flare the primary fuel is provided. In the exemplary embodiment, the method is utilized in an overnight turndown of system 100 to facilitate maximizing the efficiency of system 100, while minimizing flaring. As such, emissions from system 100 are facilitated to be reduced.

The objective of maximizing the efficiency of exemplary system 100 may be best achieved by shutting down either turbine 120 or turbine 130 each night. While shutting down a turbine 120 or 130 can be achieved in multiple ways, the exemplary method maximizes utilization of gasifier output and also minimizes flaring. Specifically, system 100 could be shifted from a two gas turbine co-fire mode or two gas turbines on primary fuel to a single gas turbine primary fuel mode using a fuel-trade concept. Fuel-trading enables a fuel transfer to secondary fuel, such as natural gas, on second turbine 130, while utilizing the excess syngas with first turbine 120.

The concept of fuel-trading has been developed to address the relative difference in rate of change that may exist between fuel production and consumption systems. Following fuel transfer, the gasifiers produce excess primary fuel, which may be flared or routed to an alternative location until the production rates match the consumption requirements. With fuel-trading, the excess primary fuel from second turbine 130 is routed to first turbine 120. This can be done in at least two modes including a co-fired mode and a primary fuel mode only.

If both turbines 120 and 130 are in co-fired mode, the second turbine 130 is transferred from co-fired operation to primary fuel only. The second turbine 130 is then reduced to a primary fuel load that matches the heat rate required to move first turbine 120 from a co-fired mode to a syngas only mode. Second turbine 130 is then transferred to secondary fuel, and, at the same time, primary fuel from turbine 130 is routed to the first turbine 120. This may result in turbine 120 transferring to a primary fuel only operation, or the turbine may remain in co-fire mode. This method facilitates absorbing all of the available primary fuel that was being used by second turbine 130, such that second turbine 130 can be shut down. In the exemplary embodiment, a restart of second turbine 130 occurs in the reverse order of the method described herein.

If both turbines are in a primary fuel only mode, the primary fuel rate to the first turbine 120 must first be reduced to absorb the excess primary fuel that will come from second turbine 130 during the fuel-trade. This can be done in a controlled rate that avoids flaring by either unloading or co-firing on gas turbine 120. The second turbine 130 is then transferred from primary-only operation to secondary-only operation and the excess primary fuel is routed to the first turbine 120.

In the exemplary embodiment, the method also includes determining and setting a transfer rate to facilitate initializing a peer-to-peer transfer at equal fuel change rates, thereby transferring the minimum required amount of fuel into/out of the combustion turbine going on or offline.

In one embodiment, the resultant conditions following a transfer consist of a reduced number of units operating on primary fuel. In another embodiment, the resultant conditions following a transfer consist of multiple units operating at a load point above the minimum specified operational point on primary fuel such that they may be loaded on primary fuel to desired output. As will be appreciated by one of ordinary skill in the art, the above-described method is not limited to the steps disclosed herein.

One concern with shutting down a gas turbine train is the subsequent cooling of the syngas piping. Cooling of the syngas piping can result in moisture condensation due to the moisturized state of the gas. While the line could be thoroughly purged with nitrogen, such purging may result in flaring to re-inventory and a need to reheat the line the next morning. Accordingly, to prevent such problems, in the exemplary embodiment, the line is continually heated using syngas from second turbine 130.

Specifically, in the exemplary embodiment, the piping 140 of first turbine 120 is kept warm by creating a pressure drop that induces a syngas flow from the piping 150 of second turbine 130 through crossover line 190. In an exemplary embodiment, the pressure drop is created by modulating a valve (not shown) that feeds second turbine 130 while leaving the line to first turbine 120 and crossover line 190 open. The induced flow heats piping 140 until first turbine 120 is restarted.

The above-described methods facilitate minimizing primary fuel emissions in transitioning for turbine maintenance or turndown. Accordingly, the methods will provide advantageous operational flexibility for power plant operations in avoiding potentially reportable events.

At least some known systems are configured to support a single gas turbine start or shutdown for the purposes of maintenance or turndown while maintaining operation of sources of primary fuel gas. The above-described systems and method facilitate a peer-to-peer controlled transfer of primary fuel, syngas, from an operating combustion turbine to a peer unit undergoing a transfer into or out of operation on syngas fuel in support of maintenance or turndown activities. In general, the methods of preparing and executing the fuel-trade event includes, but is not limited to, achieving an initial load point through specified turbine cycle conditions for the unit operating on primary fuel sufficient to enable the fuel-trade, and establishing a fuel split using secondary fuel for the peer unit in preparation for transfer from syngas to back-up fuel or vice versa.

As used herein, an element or step recited in the singular and proceeded with the word "a" or "an" should be understood as not excluding plural said elements or steps, unless such exclusion is explicitly recited. Furthermore, references to "one embodiment" of the present invention are not intended to be interpreted as excluding the existence of additional embodiments that also incorporate the recited features.

The above-described methods and system enable transitioning for turbine maintenance or turndown while minimizing primary fuel emissions. Accordingly, the above-described methods and system provide advantageous operational flexibility for power plant operations in avoiding potentially reportable events.

Exemplary embodiments of systems and methods for start-up and/or turndown of a gas turbine associated with an IGCC plant are described above in detail. The systems and methods illustrated are not limited to the specific embodiments described herein, but rather, components of the system may be utilized independently and separately from other components described herein. Further, steps described in the method may be utilized independently and separately from other steps described herein.

While the invention has been described in terms of various specific embodiments, those skilled in the art will recognize that the invention can be practiced with modification within the spirit and scope of the claims.

What is claimed is:

1. A method of operating a power generation system that includes a first gas turbine engine that operates using at least one of a primary fuel and a secondary fuel, and at least one second gas turbine engine that operates using at least one of a primary fuel and a secondary fuel, said method comprising:

channeling primary fuel to a common fuel source at a controlled flow rate;

supplying at least one of the first and second gas turbine engines with primary fuel from the common fuel source at a controlled flow rate, wherein the common fuel source is coupled to the first and second gas turbine engines;

selectively operating the first gas turbine engine between a first operational position and a second operational position, wherein the first gas turbine engine operates using only secondary fuel in the first operational position and operates using only primary fuel in the second operational position; and supplying the second gas turbine engine with primary fuel from the common fuel source at a controlled flow rate prior to operating the first gas turbine engine in the first operational position, such that the second gas turbine engine may absorb primary fuel from the first gas turbine engine without flaring the primary fuel.

2. A method in accordance with claim 1 further comprising flaring an excess primary fuel produced by at least one gasifier until the primary excess fuel has achieved a predetermined fuel quality prior to operating the first gas turbine engine.

3. A method in accordance with claim 1 further comprising adjusting a transfer rate of the primary fuel and of the secondary fuel to be substantially equal.

4. A method in accordance with claim 1 wherein a plurality of fuel lines are coupled between the common fuel source and each of the first and second gas turbine engines, said method further comprising circulating at least one of primary fuel and secondary fuel through the plurality of fuel lines when the first gas turbine engine is operating in the first operational position.

5. A method in accordance with claim 4 further comprising heating the plurality of fuel lines substantially continuously with primary fuel when the first gas turbine engine is in the first operational position.

6. A method in accordance with claim 4 wherein the system also includes a crossover line coupled in flow communication with the plurality of fuel lines and a valve, said method further comprising modulating the valve to facilitate reducing the flow pressure of the primary fuel source within the crossover line.

7. A power generation plant comprising:

a first gas turbine engine configured to operate using at least one of a primary fuel and a secondary fuel, said first gas turbine engine is selectively operable between a first operational position and a second operational position, wherein said first gas turbine engine operates using only secondary fuel in the first operational position and operates using only primary fuel in the second operational position;

at least one second gas turbine engine configured to operate using at least one of a primary fuel and a secondary fuel; and a common fuel source coupled to said first and second gas turbine engines, said common fuel source is configured to supply at least one of said first and second gas turbine engines with primary fuel at a controlled flow rate, said second gas turbine engine is configured to absorb a portion of the primary fuel from said first gas turbine engine by reducing the flow rate of primary fuel into said second gas turbine engine prior to operating said first gas turbine engine in the first operational position without flaring the primary fuel.

8. A power generation plant in accordance with claim 7 wherein an excess primary fuel produced by at least one gasifier is flared until the excess primary fuel has achieved a predetermined fuel quality prior to operating said first gas turbine engine.

9. A power generation plant in accordance with claim 7 further comprising a plurality of fuel lines coupled between said common fuel source and said first and second gas turbine engines wherein at least one of the primary fuel and the secondary fuel is circulated within said plurality of fuel lines when said first gas turbine engine is in the first operational position.

10. A power generation plant in accordance with claim 9 wherein said plurality of fuel lines are configured to be heated substantially continuously with the primary fuel when said first gas turbine engine is in the first operational position.

11. A power generation plant in accordance with claim 9 further comprising a crossover line coupled in flow communication with said plurality of fuel lines and a valve configured to modulate flow pressure within said crossover line to facilitate reducing a pressure of primary fuel within said crossover line.

12. A fuel control system, said fuel control system controls a flow of fluid to a first gas turbine engine that operates using at least one of primary fuel and secondary fuel, and controls a flow of fuel to at least one second gas turbine engine to ensure the second gas turbine engine operates using at least one of a primary fuel and a secondary fuel, said fuel control system is configured to:

supply at least one of the first and second gas turbine engines with primary fuel from a common fuel source at a controlled flow rate, wherein the common fuel source is coupled to the first and second gas turbine engines;

selectively position the first gas turbine engine between a first operational position and a second operational position, wherein the first gas turbine engine operates using secondary fuel in the first operational position and operates using primary fuel in the second operational position; and supply the second gas turbine engine with primary fuel from the common fuel source at a reduced flow rate prior to selectively positioning the first gas turbine engine in the first operational position, to enable the second gas turbine engine to absorb primary fuel from the first gas turbine engine without flaring the primary fuel.

13. A fuel control system in accordance with claim 12 further configured to flare an excess primary fuel produced by at least one gasifier to facilitate achieving a predetermined fuel quality prior to operating the first gas turbine engine.

14. A fuel control system in accordance with claim 12 further configured to adjust a transfer rate of primary fuel and a transfer rate of secondary fuel to be substantially equal.

* * * * *